United States Patent [19]

Poon

[11] Patent Number: 5,241,490

[45] Date of Patent: Aug. 31, 1993

[54] FULLY DECODED MULTISTAGE LEADING ZERO DETECTOR AND NORMALIZATION APPARATUS

[75] Inventor: Jack T. Poon, Fremont, Calif.

[73] Assignee: Intel Corporation, Santa Clara, Calif.

[21] Appl. No.: 817,302

[22] Filed: Jan. 6, 1992

[51] Int. Cl.⁵ .............................................. G06F 5/01
[52] U.S. Cl. ............................................... 364/715.04
[58] Field of Search ............ 364/715.04, 715.1, 715.08

[56] References Cited

U.S. PATENT DOCUMENTS

| | | | |
|---|---|---|---|
| 4,064,421 | 12/1977 | Gajski et al. | 364/715.1 |
| 4,773,033 | 9/1988 | Ikumi | 364/715.04 |
| 4,785,421 | 11/1988 | Takahashi et al. | 364/715.1 |
| 5,091,874 | 2/1992 | Watanabe et al. | 364/715.1 |

OTHER PUBLICATIONS

"Using a Common Barrel Shifter for Operand Normalization, Operand Alignment and Operand Unpack and Pack in Floating Point" *IBM Tech. Disclosure Bulletin* vol. 29, No. 2, Jul. 1986, pp. 699–701.

*Primary Examiner*—David H. Malzahn
*Attorney, Agent, or Firm*—Blakely, Sokoloff, Taylor & Zafman

[57] ABSTRACT

Multistage leading zero detection is used in a left-shift normalization unit for normalizing floating-point mantissas. Detection of the leading one is accomplished by segmenting the mantissa into non-overlapping segments. The most significant segment containing a non-zero value bit is detected producing a fully decoded output in which an output line is activated corresponding to the segment position within the mantissa where the leading one has been detected. A second level of detection selects the designated most significant segment and detects the position of the most significant non-zero bit within the segment producing a fully decoded output and, in turn, causes the activation of a line within a second set of lines that corresponds to the leading one bit position within the segment. This leading zero two stage detector is combined with a multistage left-shift unit to form a complete left-shift normalization unit in which the multistage fully decoded leading zero detector is used to control the multistage left-shift unit.

11 Claims, 12 Drawing Sheets

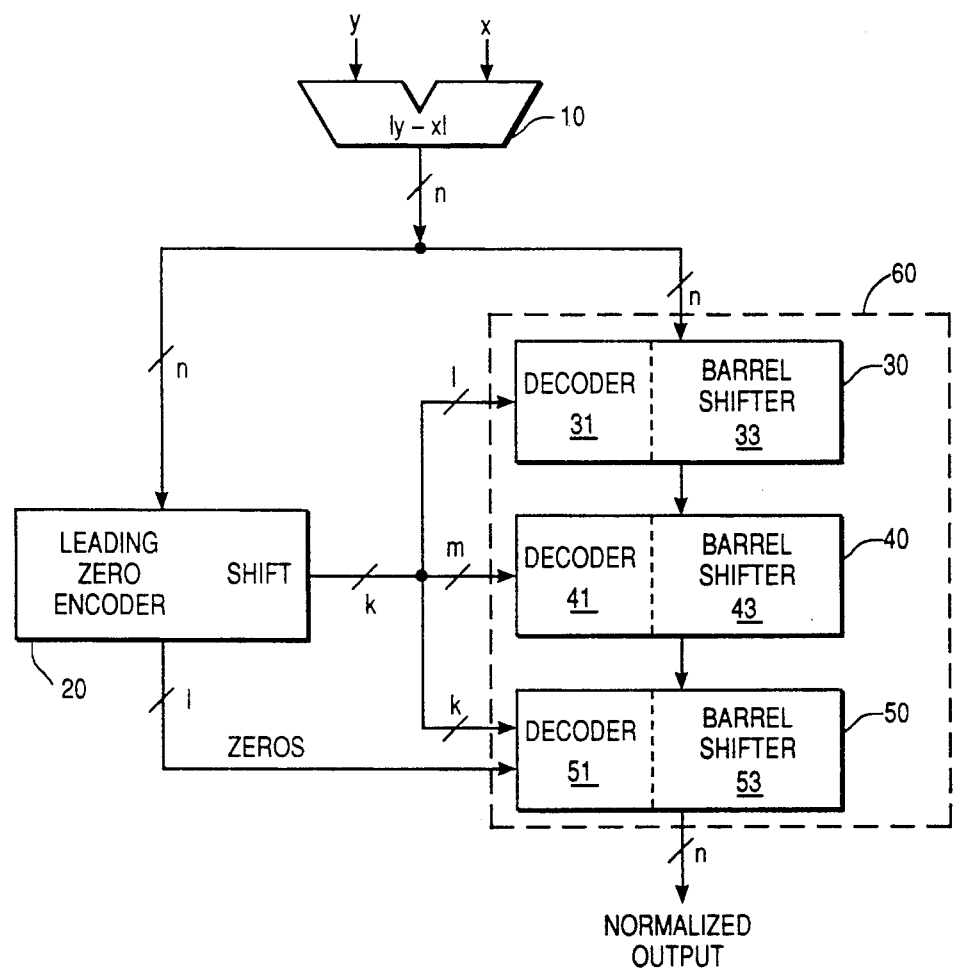
FIG_1 (PRIOR ART)

FIG. 2 (PRIOR ART)

| SHIFT CODE msb | | | lsb | LEFT SHIFT OUTPUT MSB 15 | 14 | 13 | 12 | 11 | 10 | 9 | 8 | 7 | 6 | 5 | 4 | 3 | 2 | 1 | LSB 0 | ZEROS |
|---|---|---|---|---|---|---|---|---|---|---|---|---|---|---|---|---|---|---|---|---|
| 0 | 0 | 0 | 0 | A15 | A14 | A13 | A12 | A11 | A10 | A9 | A8 | A7 | A6 | A5 | A4 | A3 | A2 | A1 | A0 | 0 |
| 0 | 0 | 0 | 1 | A14 | A13 | A12 | A11 | A10 | A9 | A8 | A7 | A6 | A5 | A4 | A3 | A2 | A1 | A0 | N | 0 |
| 0 | 0 | 1 | 0 | A13 | A12 | A11 | A10 | A9 | A8 | A7 | A6 | A5 | A4 | A3 | A2 | A1 | A0 | N | N | 0 |
| 0 | 0 | 1 | 1 | A12 | A11 | A10 | A9 | A8 | A7 | A6 | A5 | A4 | A3 | A2 | A1 | A0 | N | N | N | 0 |
| 0 | 1 | 0 | 0 | A11 | A10 | A9 | A8 | A7 | A6 | A5 | A4 | A3 | A2 | A1 | A0 | N | N | N | N | 0 |
| 0 | 1 | 0 | 1 | A10 | A9 | A8 | A7 | A6 | A5 | A4 | A3 | A2 | A1 | A0 | N | N | N | N | N | 0 |
| 0 | 1 | 1 | 0 | A9 | A8 | A7 | A6 | A5 | A4 | A3 | A2 | A1 | A0 | N | N | N | N | N | N | 0 |
| 0 | 1 | 1 | 1 | A8 | A7 | A6 | A5 | A4 | A3 | A2 | A1 | A0 | N | N | N | N | N | N | N | 0 |
| 1 | 0 | 0 | 0 | A7 | A6 | A5 | A4 | A3 | A2 | A1 | A0 | N | N | N | N | N | N | N | N | 0 |
| 1 | 0 | 0 | 1 | A6 | A5 | A4 | A3 | A2 | A1 | A0 | N | N | N | N | N | N | N | N | N | 0 |
| 1 | 0 | 1 | 0 | A5 | A4 | A3 | A2 | A1 | A0 | N | N | N | N | N | N | N | N | N | N | 0 |
| 1 | 0 | 1 | 1 | A4 | A3 | A2 | A1 | A0 | N | N | N | N | N | N | N | N | N | N | N | 0 |
| 1 | 1 | 0 | 0 | A3 | A2 | A1 | A0 | N | N | N | N | N | N | N | N | N | N | N | N | 0 |
| 1 | 1 | 0 | 1 | A2 | A1 | A0 | N | N | N | N | N | N | N | N | N | N | N | N | N | 0 |
| 1 | 1 | 1 | 0 | A1 | A0 | N | N | N | N | N | N | N | N | N | N | N | N | N | N | 0 |
| 1 | 1 | 1 | 1 | A0 | N | N | N | N | N | N | N | N | N | N | N | N | N | N | N | 0 |
| X | X | X | X | N | N | N | N | N | N | N | N | N | N | N | N | N | N | N | N | 1 |

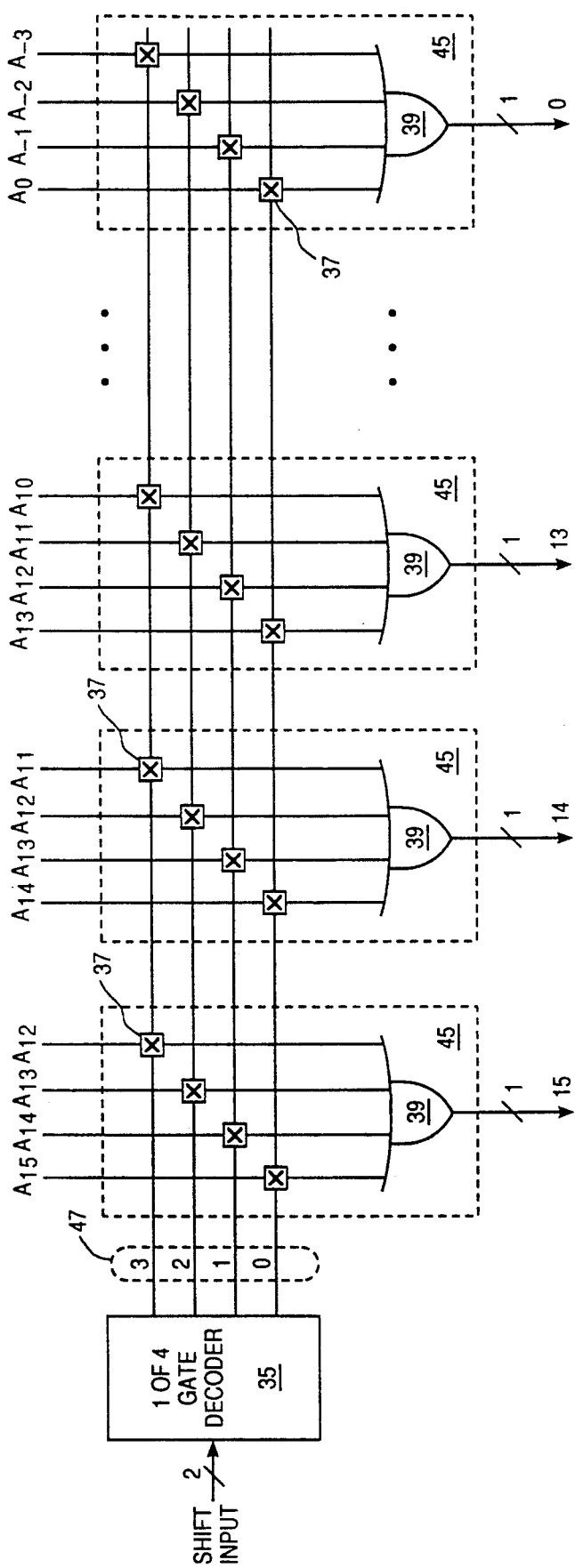
FIG_3 (PRIOR ART)

FIG_4 (PRIOR ART)

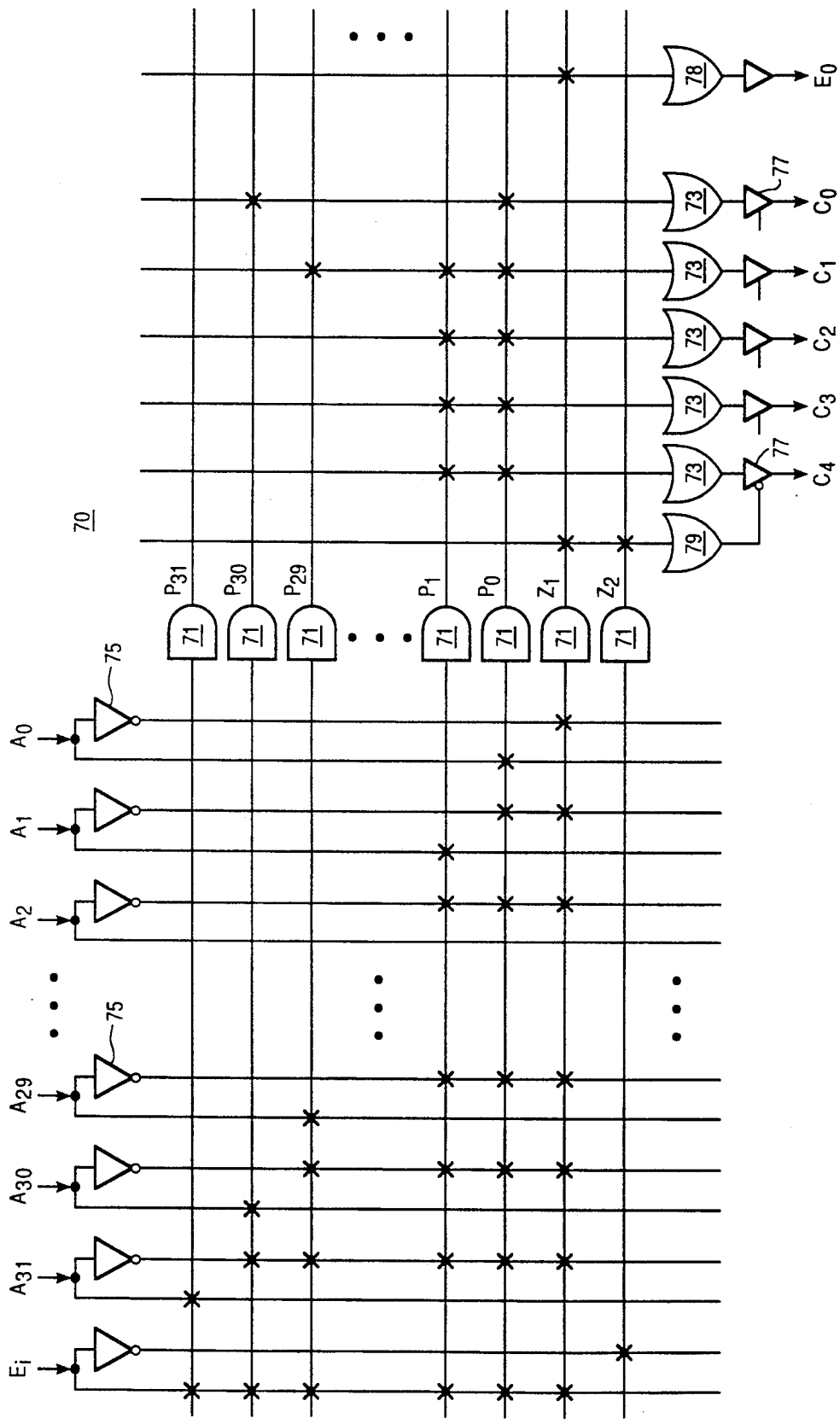
FIG_5 (PRIOR ART)

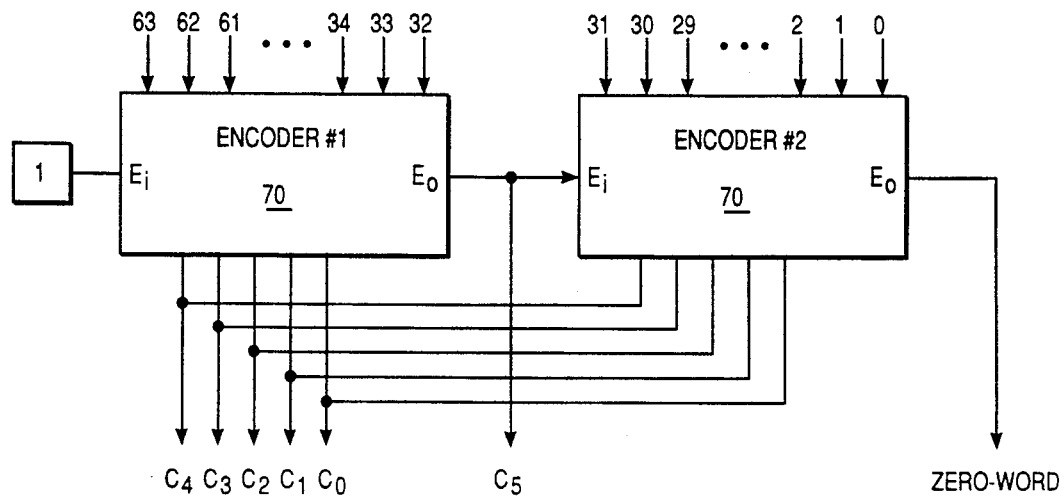
FIG_6 (PRIOR ART)
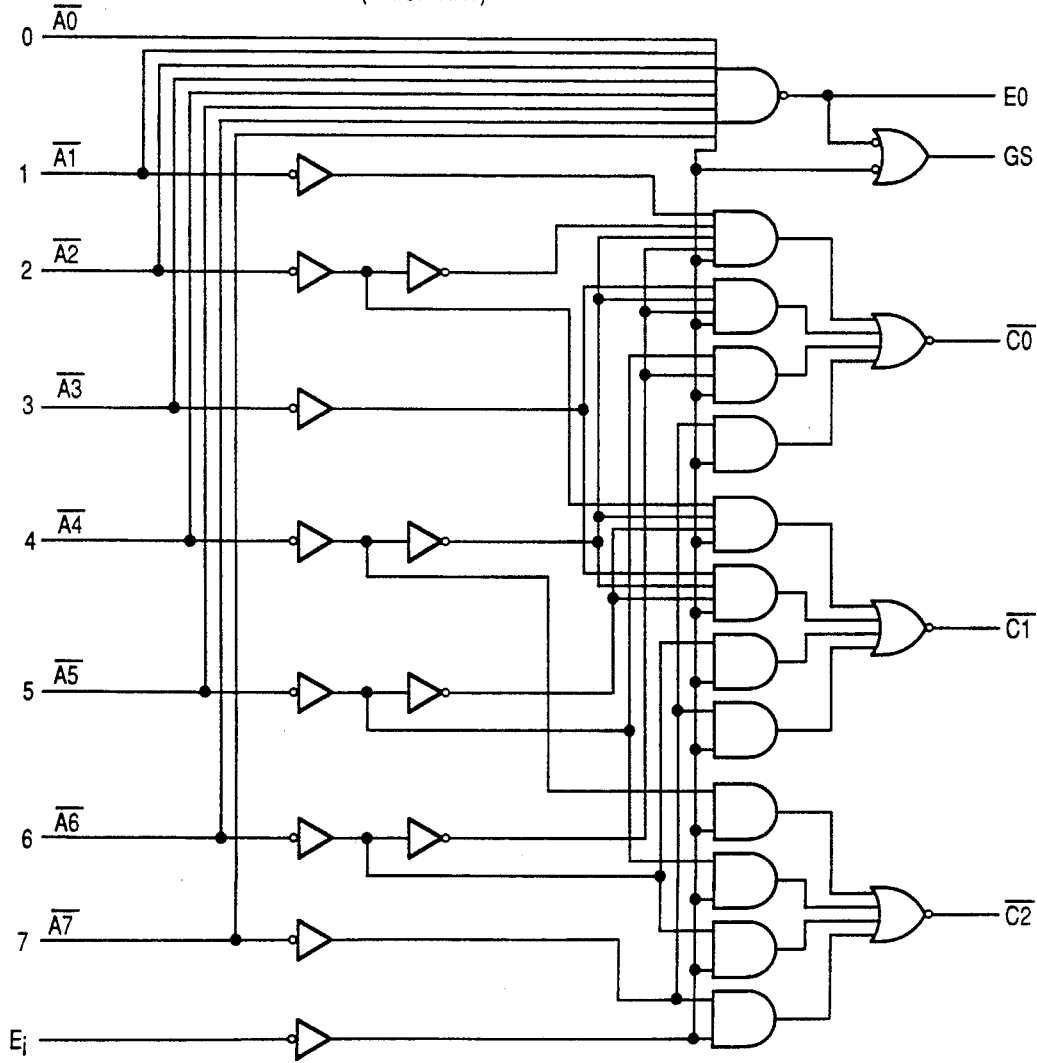
FIG_7 (PRIOR ART)

FIG_8 (PRIOR ART)
| INPUTS | | | | | | | | | OUTPUTS | | | | |
|---|---|---|---|---|---|---|---|---|---|---|---|---|---|
| EI | 0 | 1 | 2 | 3 | 4 | 5 | 6 | 7 | A2 | A1 | A0 | GS | EO |
| H | X | X | X | X | X | X | X | X | H | H | H | H | H |
| L | H | H | H | H | H | H | H | H | H | H | H | H | L |
| L | X | X | X | X | X | X | X | L | L | L | L | L | H |
| L | X | X | X | X | X | X | L | H | L | L | H | L | H |
| L | X | X | X | X | X | L | H | H | L | H | L | L | H |
| L | X | X | X | X | L | H | H | H | L | H | H | L | H |
| L | X | X | X | L | H | H | H | H | H | L | L | L | H |
| L | X | X | L | H | H | H | H | H | H | L | H | L | H |
| L | X | L | H | H | H | H | H | H | H | H | L | L | H |
| L | L | H | H | H | H | H | H | H | H | H | H | L | H |
LEGEND: H = HIGH, L = LOW, X = IRRELEVANT
FIG_9 (PRIOR ART)
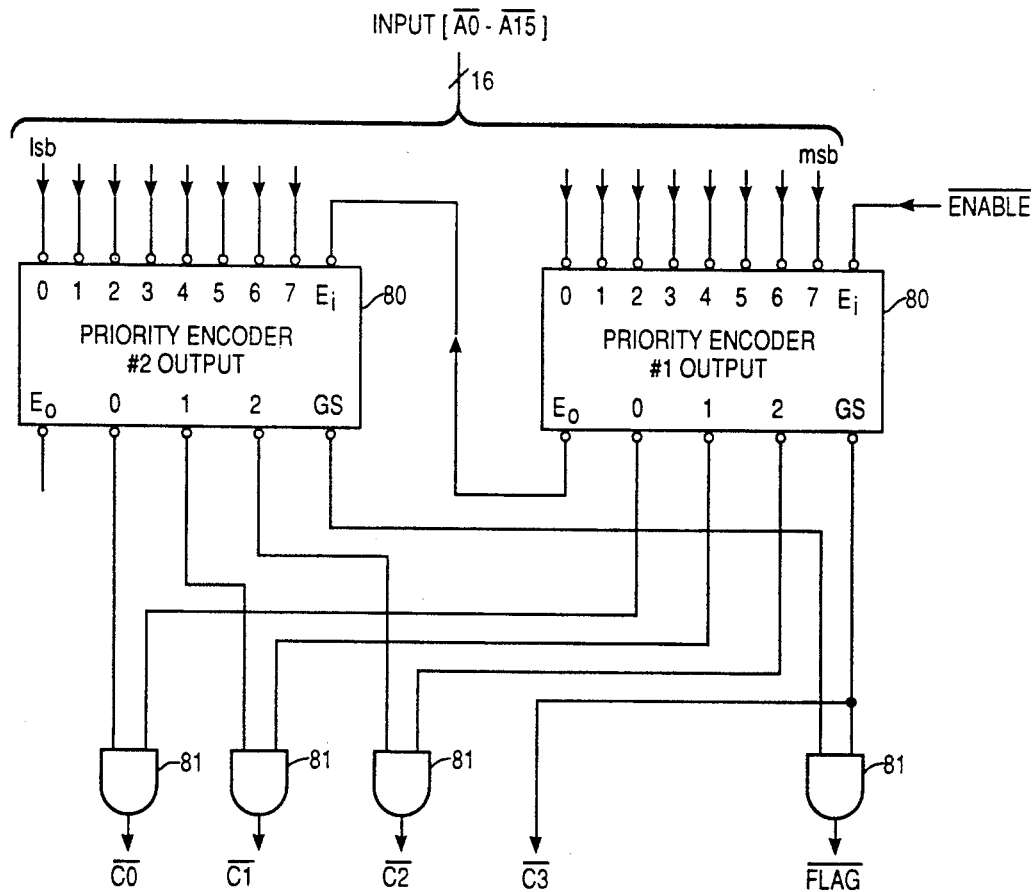

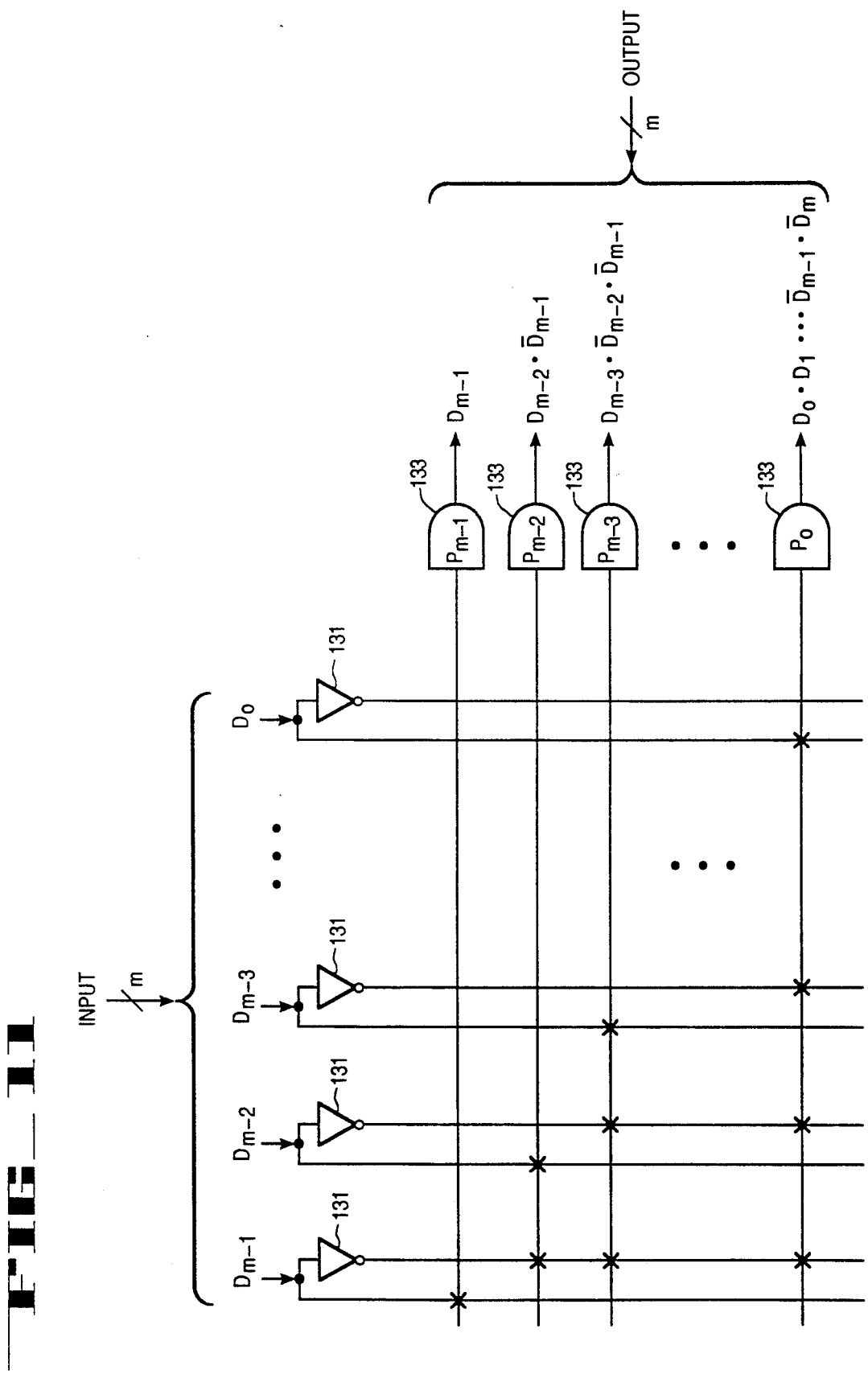
FIG._11

FIG_12

| INPUT | | | | | OUTPUT | | | | |
|---|---|---|---|---|---|---|---|---|---|
| msb | | | | lsb | | | | | |
| 0 | 1 | 2 | 3 | 4 | 0 | 1 | 2 | 3 | 4 |
| 0 | 0 | 0 | 0 | 0 | 0 | 0 | 0 | 0 | 0 |
| 0 | 0 | 0 | 0 | 1 | 0 | 0 | 0 | 0 | 1 |
| 0 | 0 | 0 | 1 | 0 | 0 | 0 | 0 | 1 | 0 |
| 0 | 0 | 0 | 1 | 1 | 0 | 0 | 0 | 1 | 0 |
| 0 | 0 | 1 | 0 | 0 | 0 | 0 | 1 | 0 | 0 |
| 0 | 0 | 1 | 0 | 1 | 0 | 0 | 1 | 0 | 0 |
| 0 | 0 | 1 | 1 | 0 | 0 | 0 | 1 | 0 | 0 |
| 0 | 0 | 1 | 1 | 1 | 0 | 0 | 1 | 0 | 0 |
| 0 | 1 | 1 | 0 | 0 | 0 | 1 | 0 | 0 | 0 |
| 0 | 1 | 0 | 0 | 1 | 0 | 1 | 0 | 0 | 0 |
| 0 | 1 | 0 | 1 | 0 | 0 | 1 | 0 | 0 | 0 |
| 0 | 1 | 0 | 1 | 1 | 0 | 1 | 0 | 0 | 0 |
| 0 | 1 | 0 | 0 | 0 | 0 | 1 | 0 | 0 | 0 |
| 0 | 1 | 1 | 0 | 1 | 0 | 1 | 0 | 0 | 0 |
| 0 | 1 | 1 | 1 | 0 | 0 | 1 | 0 | 0 | 0 |
| 0 | 1 | 1 | 1 | 1 | 0 | 1 | 0 | 0 | 0 |
| 1 | 0 | 1 | 0 | 0 | 1 | 0 | 0 | 0 | 0 |
| 1 | 0 | 0 | 0 | 1 | 1 | 0 | 0 | 0 | 0 |
| 1 | 0 | 0 | 1 | 0 | 1 | 0 | 0 | 0 | 0 |
| 1 | 0 | 0 | 1 | 1 | 1 | 0 | 0 | 0 | 0 |
| 1 | 0 | 0 | 0 | 0 | 1 | 0 | 0 | 0 | 0 |
| 1 | 0 | 1 | 0 | 1 | 1 | 0 | 0 | 0 | 0 |
| 1 | 0 | 1 | 1 | 0 | 1 | 0 | 0 | 0 | 0 |
| 1 | 0 | 1 | 1 | 1 | 1 | 0 | 0 | 0 | 0 |
| 1 | 1 | 0 | 0 | 0 | 1 | 0 | 0 | 0 | 0 |
| 1 | 1 | 0 | 0 | 1 | 1 | 0 | 0 | 0 | 0 |
| 1 | 1 | 0 | 1 | 0 | 1 | 0 | 0 | 0 | 0 |
| 1 | 1 | 0 | 1 | 1 | 1 | 0 | 0 | 0 | 0 |
| 1 | 1 | 1 | 0 | 0 | 1 | 0 | 0 | 0 | 0 |
| 1 | 1 | 1 | 0 | 1 | 1 | 0 | 0 | 0 | 0 |
| 1 | 1 | 1 | 1 | 0 | 1 | 0 | 0 | 0 | 0 |
| 1 | 1 | 1 | 1 | 1 | 1 | 0 | 0 | 0 | 0 |

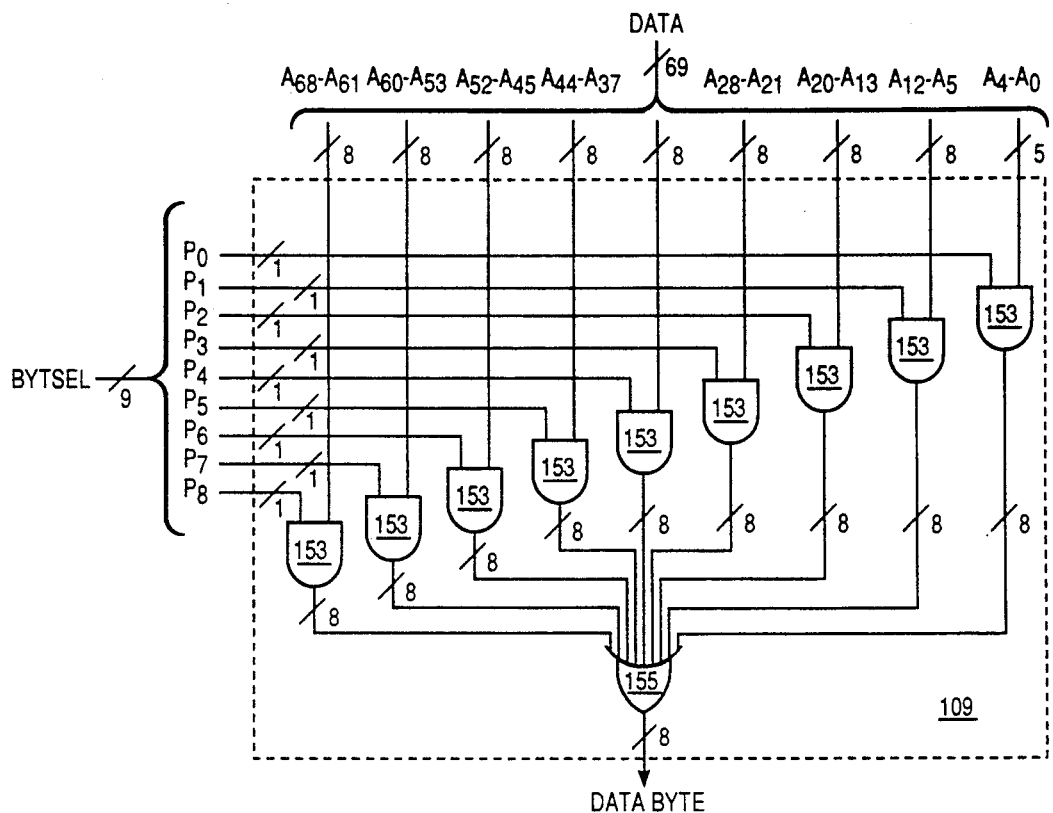
FIG_13
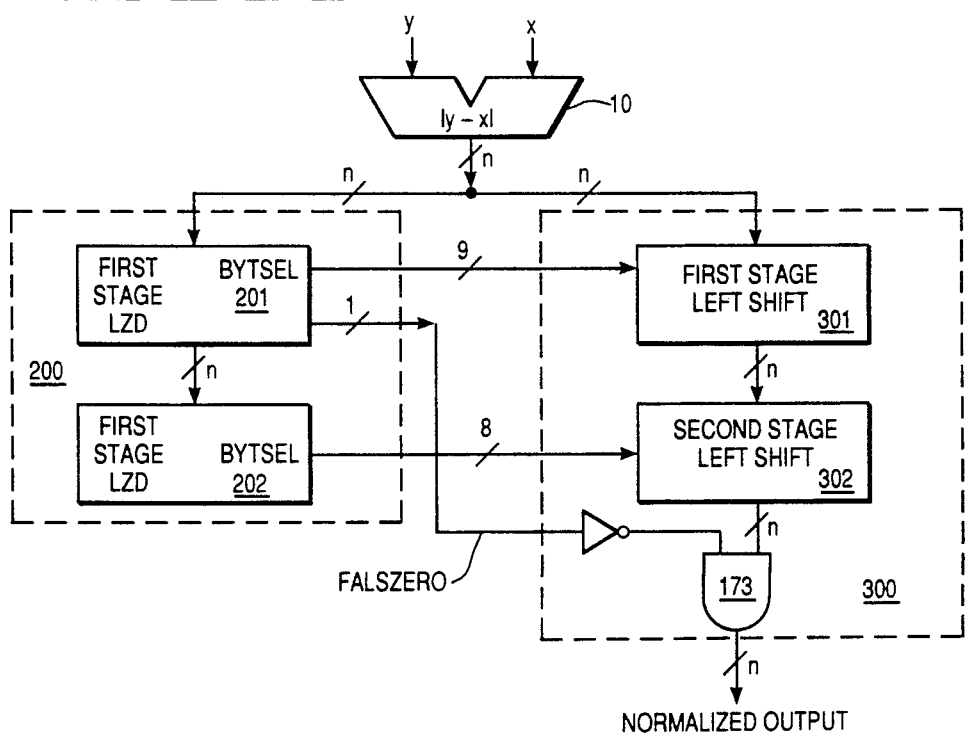
FIG_14

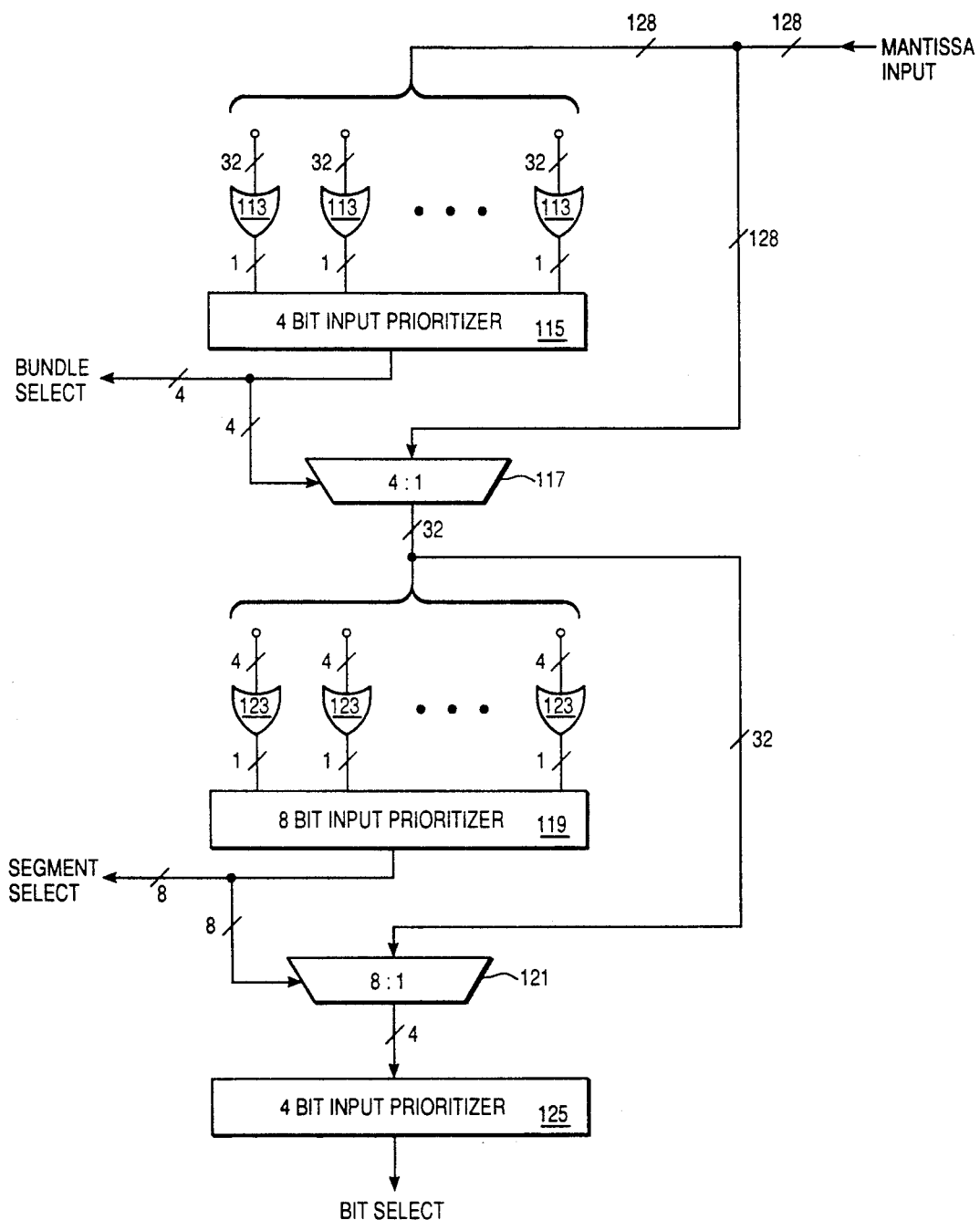

FULLY DECODED MULTISTAGE LEADING ZERO DETECTOR AND NORMALIZATION APPARATUS

FIELD OF INVENTION

The invention pertains to the field of floating-point arithmetic processes and more specifically to the detection of mantissa leading zeros and the generation of gate signals for the control of left shift normalization apparatus.

BACKGROUND TO THE INVENTION

An important application for leading zero detection is in the normalization of the mantissa that results from the true subtraction of two floating-point numbers, particularly when the normalized mantissas of the operands have associated exponents that differ by no more than one bit. Clearly, the closer the magnitudes of the operands, the greater number of leading zeros that obtain in the resulting difference of the normalized operand mantissas. The floating-point result is normalized by left shifting the mantissa. For example, if the un-normalized result of the subtraction yields 0.0001XXX . . . X, the normalized result would be 0.1XXX . . . X000 or 1.XXX . . . X0000, depending on the floating-point convention that is used. In the former case, the mantissa is left-shifted by 3-bit positions, causing three zeros to be appended and also causing the associated exponent to be decremented by 3; in the latter case, with the binary point to the right of the leading one (or hidden "1"), the normalization operation required a shift of 4-bit positions and decrementing the associated exponent by 4. Regardless of the convention used, a means for detecting the leading one (or number of leading zeros) is required for control of the post subtraction normalization unit.

FIG. 1 is a block diagram of a typical state of the art left-shift normalization unit. The normalization unit consists of a leading zero encoder (LZE) unit 20 that controls left-shift normalizing unit 60. Input data is supplied from subtractor 10 which produces at its output an un-normalized mantissa corresponding to the absolute difference of the operands. (The signum information is carried as a separate sign bit). This n-bit result is applied to both LZE 20 and shifter 60.

Left shift unit 60 typically comprises barrel shifter means 30 and 40 for rotating the input bit string and a zero mask means 50 for appending zeros. FIG. 2 is a truth table for a 16-bit input left-shift normalizing unit 60 in which "Z" represents zero introduce by zero-mask unit 50. The 4-bit shift code and 1-bit zeros signal is generated by LZE unit 20. The binary coded shift code is applied to barrel shifter means 30 and 40, while the zeros (active if the difference is zero) is applied to zero-mask unit 50 forcing zeros (Z) in all bit positions.

The reason for using two barrel shifter units (30 and 40) in normalizer 60 is because of the circuit complexity that would obtain if the total shift were to be accomplished in a single stage. This may be best understood by reference to FIG. 3, a block diagram of a 3-bit left shifter operating on an input string of 16-bits. The two-bit binary encoded shift input signal is applied to gate decoder 35 that decodes the 4-state input signal and activates one out of four output lines 47. Each of the four output lines is applied to 16 shift cell units 45 as an input to one of four corresponding two-input AND-gates 37. The other input to each of the AND-gates 37 was provided from the input resultant data bit string, $[A_{15}-A_0]$, as shown. For example, line 0, corresponding to a zero shift is connected to the lower set of AND-gates 37 so that when line 0 is active, outputs 15-0 correspond to $[A_{15}-A_0]$. Similarly, line 1, corresponding to a one-bit left shift is applied to the set of gates having $[A_{14}-A_{-1}]$ connected as inputs causing the input string $[A_{14}-A_{-1}]$ to appear at outputs 15-0. Activating line 2 or 3 would cause input string $[A_{13}-A_{-2}]$ or $[A_{12}-A_{-3}]$ to appear at output 15-0. Because decoder 35 selects one out of four output lines, 4-input OR-gates 39 provide the multiplexing required to feed the selected bits to the output terminals.

If input bits $[A_{-1}-A_{-3}]$ are connected to $[A_{15}-A_{13}]$ respectively, the shift operation produces and end-around rotation or barrel shift of the input string $[A_{15}-A_0]$; if $[A_{-1}-A_{-3}]$ are forced inactive, zeros would be appended to the shifted string.

Because floating-point processors accommodate mantissas with 64-bits (or more), extending the structure of FIG. 3 to 64-bits shifts would require 64 shift cell units 45, each having 64 AND-gates (or a total of 4096 AND-gates) together with the accompanying interconnect and control complexity. Consequently, the shift process is usually done in two stages as shown in FIG. 1.

The first stage shifter 30 may typically accommodate shifts of 0-bits while the second stage 40 has 8 shift cells and provides shifts of 0, 8, 16, 24, . . . 56. A similar cell structure to that described above is used except that each AND-gate accommodates 8 bundles of 8 input data bits. For a discussion of these techniques, see "Introduction to Arithmetic for Digital Systems Designers," Waser, S., and Flynn, M. J., Holt, Rinchat and Winston, 1982, pp. 106-123.

Referring back to FIG. 1, it should be noted that shift units 30 and 40 are designed to accept binary coded shift instruction from LZE 20. As shown, the k-bit shift instruction is split into an l-bit and m-bit field where l corresponds to the group of lower order bits while m corresponds to the higher order bits. Decoder 31 and 41 of units 30 and 40 respectively decode this information to activate 1 out-of $2^l$ or 1 out-of $2^m$ gate control lines. Similar decoding of k-bits occurs in zero mask unit 50.

FIG. 4 is a truth table for a 32-bit input LZE 20 unit. The input data bits are numbered [31-0] along the top. The output binary shift count of leading zeros is enumerated vertically along the right side. Also, an additional input control bit, $E_i$, is shown at the extreme left. $E_i$ is an enable control bit that, together with $E_0$, is used to cascade standard modular LZE networks to accommodate longer bit strings.

Each horizontal line of the table shows the position of the leading 1 and the resulting leading zero count. The symbol X following the leading one indicates that the value may be arbitrarily 0 or 1. Also, note that if all input bit patterns are zero, $E_0$ is made active while the shift count is made zero (z=0) indicating a zero valued input. If $E_i=0$, the output is disabled.

FIG. 5 shows a programmable logic array (PLA) implementation of a 32-bit input LZE 20. Data input bits $[A_{31}-A_0]$ and their complements $[\overline{A_{31}}-\overline{A_0}]$ are applied to the multi-input AND-gates 71 as indicated by the x-marks on the horizontal lines feeding the gates. The complements are generated by inverting buffers 75. Ei is an enabling input that is used to cascade modular LZE units. The AND-gate outputs $P_0-P_{31}$ are individually and exclusively activated (1 out of 32) in accordance with the following boolean expressions:

$$P_{31} = E_i * A_{31}$$
$$P_{30} = E_i * \overline{A_{31}} * A_{30}$$
$$P_{29} = E_i * \overline{A_{31}} * \overline{A_{30}} * A_{29}$$
$$\cdot \quad \cdot$$
$$\cdot \quad \cdot$$
$$\cdot \quad \cdot$$
$$P_1 = E_i * \overline{A_{31}} * \overline{A_{30}} * \overline{A_{29}} \ldots \overline{A_2} * A_1$$
$$P_0 = E_i * \overline{A_{31}} * \overline{A_{30}} * \overline{A_{29}} \ldots \overline{A_2} * \overline{A_1} * A_0$$

These expressions, as implemented in FIG. 5 ensure that a particular AND-gate 71 output, $P_k$, is active only if the network in enabled ($E_i = 1$) and Ak is active while all An, n>k, are inactive.

OR-gates 73 logically combine selected combinations of AND-gates 71 as indicated by the X-mark on the OR-gate input lines. The output bits, [C4–C0] are supplied by tri-state buffers 77 which are controlled by the output of OR-gate 79. If the network is enabled (Ei=1) and all input bits [A31–A0] are low AND-gate output Z1 is active indicating all input bits are zero. Also, AND-gate output Z2 is active if E1=0. Either of these two conditions will float output buffers 77. This latter feature is useful for cascading two (or more) LZE units as shown in FIG. 6.

Two LZE 70 units may be connected to accommodate a 64-bit input data string. LZE #1 accepts bits [A63–A32] while LZE #2 accepts bits [A31–A0]. Enable output, E0, from LZE #1 enables LZE #2 when all higher order bits are zero and also asserts output bit C5 indicating that none of the 32-higher order bits active high. The encoded output bits [C4–C0] of LZE #2, wired-OR with the corresponding disabled outputs of LZE #1, provided the five lower order bits. LZE #2 provides E0 active to indicate that all 64 bits are low.

Some earlier implementations of LZE units used 8-bit priority encoder ICs. FIG. 7 shows the logic diagram of an 8-bit priority encoder such as the Motorola 74LS148 or the logically equivalent Natural Semiconductor CMOS 74HC148. This chip has 8-input lines $\lfloor \overline{A_7} - \overline{A_0} \rfloor$ and produces at its outputs $\lfloor \overline{C_2} - \overline{C_0} \rfloor$. Also, input enable, $E_i$, output enable, $\overline{E_0}$, and $\overline{G_s}$, the complemented zero indicator is provided. FIG. 8, the corresponding truth table, clearly shows that these 8-bit priority encoders are the complemented equivalent of the LZE described above.

Cascading of these units may be accomplished as indicated in FIG. 9 and extended in multiples of 8-bits.

SUMMARY OF THE INVENTION

An apparatus and method for detecting the number of leading zeros in the mantissa of a floating point number is described. Leading zero detection comprises several steps: the segmentation of the mantissa into bytes (or more generally into groups of 2N, N=1,2,3); OR-ing of the bits in each segment to detect the most significant segment containing a non-zero valued bit; activating a line corresponding to the most significant non-zero segment; processing the most significant non-zero segment to determine the position of the most significant non-zero bit and activating an output line corresponding to the most significant bit position within the selected segment. This process results in two sets of fully decoded gate signals (segment and bit level) for controlling multi-stage left shift units.

This multi-stage leading zero detector is combined with a multi-stage left-shift unit to form a left-shift normalization unit.

One object of the invention is to simplify the left-shift normalization process by providing fully decoded gate thereby eliminating encoding and decoding apparatus in the leading zero detection unit and left shift unit respectively.

Another object is to provide higher processing rates by use of multi-stage left-shift process by first detecting the most significant non-zero segment causing a course left-shift, followed by detection of the most significant non-zero bit causing a fine left-shift. Thus, timing of zero detection more closely matches timing of the left shift apparatus.

BRIEF DESCRIPTION OF THE DRAWINGS

FIG. 1 is a block diagram of a floating point subtractor unit and left-shift normalization point subtractor unit and left-shift normalization unit.

FIG. 2 is the truth table of a 16-bit left-shift normalization unit.

FIG. 3 is a block diagram of a 3-bit left shifter.

FIG. 4 is a truth table of a 32-bit leading zero encoder.

FIG. 5 shows a block diagram for a programmable logic array implementation of a 32-bit leading zero encoder.

FIG. 6 is a block diagram of two 32-bit leading zero encoders cascaded to form a 64-bit unit.

FIG. 7 is a logic diagram of an 8-bit priority encoder.

FIG. 8 is the truth table of an 8-bit priority encoder.

FIG. 9 shows a method for cascading two 8-bit priority encoders.

FIG. 11 is a programmable logic array implementation of a leading zero gate signal generator.

FIG. 12 is the truth table of a 5-bit input leading zero gate signal generator.

FIG. 13 is a logic diagram of a 9 to 1 multiplexer unit.

FIG. 14 is a block diagram of a three stage left shift normalization unit.

FIG. 15 is an example of a three stage leading zero detector.

DETAILED DESCRIPTION OF THE INVENTION

Figure 10:
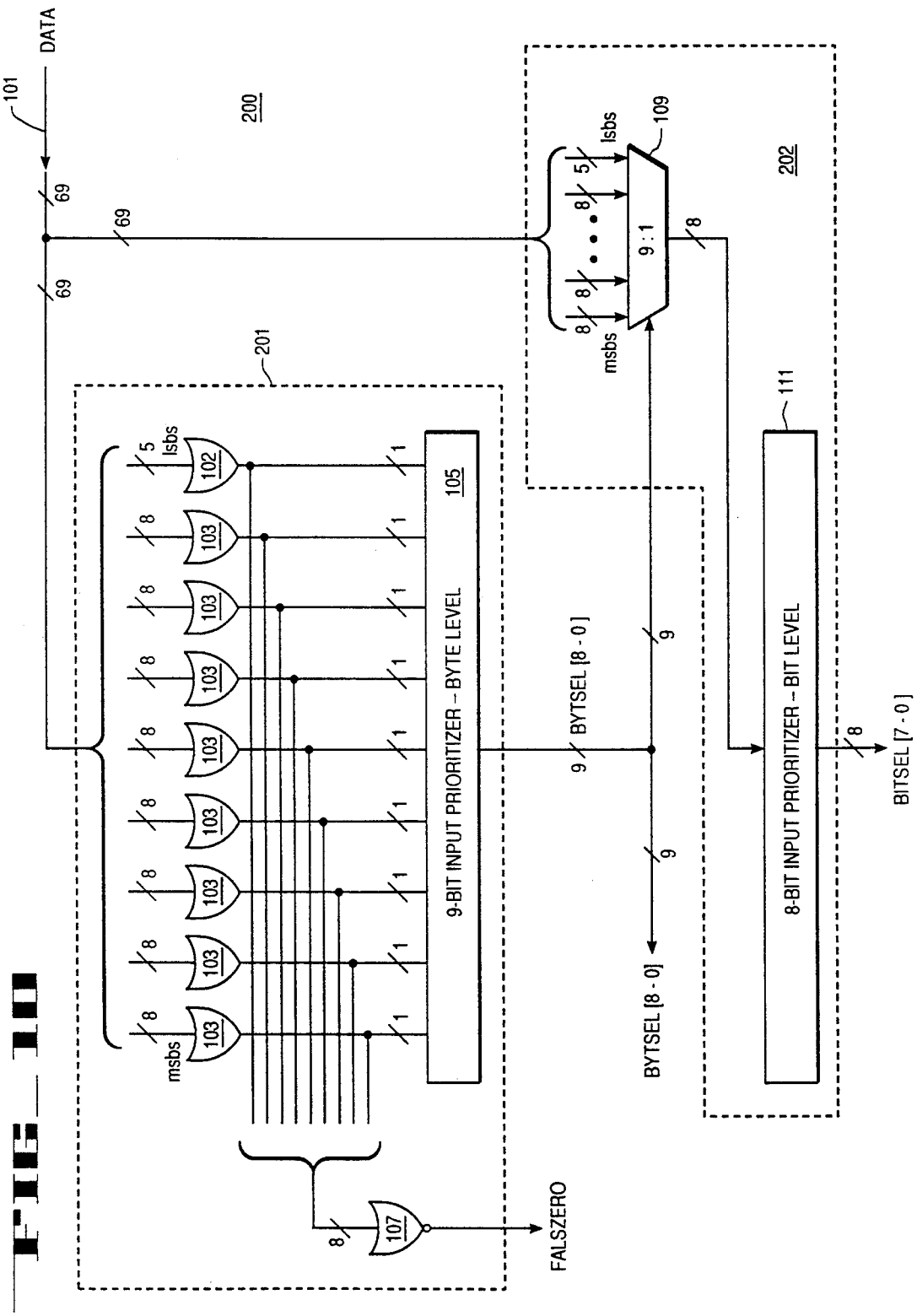
FIG. 10 is a block diagram of a preferred embodiment of a multistage leading zero encoder.

Although the following discussion of the present invention is centered around the preferred embodiment of a two stage leading zero decoder, it will become clear that the present invention is not limited to two-stages but also applies to apparatus using three or more stages. Also, the preferred embodiment uses byte (8-bit) segments but clearly is not limited to byte size segments.

The preferred embodiment of a two stage leading zero decoder (LZD) 200 in FIG. 10, comprises first stage byte level decoder 201 and second stage bit level decoder 202. It is designed to accommodate a floating-point processor with an extended internal precision mantissa of 69 bits supplied on input data lines 101. This input data is fed to a group of eight 8-bit input OR-gates 103 and a single 5-bit input OR-gate 102. The extreme left OR-gate 103 accommodates the most significant byte comprising the eight most significant bits (msbs); the second from the left, the next most significant byte of eight bits and so on down to the least significant byte (lsbs) of five bits applied to OR-gate 102. The output of each OR-gate is asserted if its input byte contains at least one asserted bit.

The set of eight output bits from OR-gates 103 are applied to NOR-gate 107. Gate 107 output, FALSZERO, is asserted only if all eight of its input bits is zero (unasserted), and is used to control the output stage of the normalization left shift unit.

The set of nine output bits from OR-gates 103 and 102 are provided to the input of the 9-bit fully decoded prioritizer unit 105. The output of prioritizer unit 105 activates 1-out-of-9 output lines rather than provide a 4-bit binary coded output. The activated output line corresponds to the highest level byte having at least one bit as indicated by the outputs of OR-gates 103 and 102. The output is a fully decoded output which is applied directly to selector 109 and made available to the first stage of a three stage left shift normalization unit as BYTSEL.

The operation of the fully decoded 9-bit prioritizer unit may be best understood by reference to FIG. 11 showing the logical structure of an m-bit prioritizer unit suitable for implementation of unit 105. The prioritizer accepts m input bits $[D_{m-1}-D0]$ forming the complement set $[\overline{D}_{m-1}-\overline{D_0}]$ by means of inverting buffers 131. The output is formed by means of AND-gates 133. (Note that the AND-gate 133 labelled $P_{m-1}$ simply ANDs the single input with itself thus acting as a simple buffer). As in the case of the PLA implementation of FIG. 5, the "x" indicates connections to the input of the AND-gate associated with that particular horizontal line. In this manner, only 1-out-of-m output lines are activated corresponding to the most significant bit position in the input bit set $[D_{m-1}-D_0]$, satisfying the following logic expressions:

$$P_{m-1} = D_{m-1}$$
$$P_{m-2} = D_{m-2} \cdot \overline{D}_{m-1}$$
$$P_{m-3} = D_{m-3} \cdot \overline{D}_{m-2} \cdot \overline{D}_{m-1}$$
$$\vdots$$
$$P_0 = D_0 \cdot \overline{D_1} \cdot \overline{D_2} \ldots \overline{D}_{m-2} - \overline{D}_{m-1}$$

Thus, $P_{m-k}$ is active only when $D_{m-k}$ is active and no higher order input bit, $D_{m-k+n}$, is active for $n>0$. In the preferred embodiment m=9.

FIG. 12 is, by way of example, the truth table for a 5-bit input fully decoded prioritizer unit. The five input bit states are shown in the left while the state of the five output lines are shown on the right. The position of the leading active input bit on the right corresponds to the activated line on the right independent of the state of the lower order input bits. Also, note that if all input bits are inactive, all output lines are inactive.

Referring back to FIG. 10, the fully decoded 9-bit prioritizer 105 output lines, BYTSEL, are applied to multiplexer (MUX) unit 109 as control lines. The purpose of multiplexer unit 109 is to select one-out-of-nine input data bytes each composed of eight contiguous bits except the least significant byte $[A_4-A_0]$ having only 5 bits.

FIG. 13 is a logic diagram of a multiplexer unit 109. The nine input lines [P8-P0] each control a byte selector 153 each comprising a set of 8-AND gates. Whenever an input line [P8-P1] is activated, it selects a group of data lines [A68-A61], [A60-A53], [A52-A45], [A44-A37], [36-A29], [A28-A21], [A20-A13] or [A12-A5]. The 5-bit byte [A4-A0] is selected by means of the AND-gate set 151 controlled by activating P0. (Compatibility of byte size requires that three lower order zeros be appended to [A4-A0] in order to complete the eight bit byte string.) Each of the byte selectors (151 or 153) outputs are OR-ed by the 8 output channel OR-gate unit 155. The output represents the 8-bit byte containing the leading one. Hence, the output of MUX 109 has to be processed by the second level 8-bit input decoded prioritizer unit 111 of FIG. 10 to indicate the bit position in the previously selected byte that contains the leading one.

Decoder prioritizer unit 111 is logically constructed as shown in FIG. 11. The eight bit byte is applied to terminals [D7-D0]. One-of-eight output lines [P0-P7], is selected to indicate the position of the leading one. The output signal, BITSEL, is provided to the second stage of the left shift normalization unit.

FIG. 14 is a block diagram of the left shift normalizing unit comprising LZD unit 200 and normalizing unit 300. The first stage 301 of unit 300 shifts the data by 0, 8, 16, 24, 32, 40, 48, 56 or 64 bits depending upon the nine most significant lines of byte control signal BYTESEL [8-0] provided by first stage LZD unit 201 of FIG. 10. The second stage left shifter 302 shifts the mantissa by 0, 1, 2, 3, 4, 5, 6, or 7 bits depending on the state of the eight lines, BITSEL [7-0] supplied by prioritizer 111 of FIG. 10. No decoding of the left shift control signals by units 301 and 302 is required because BYTSEL and BITSEL are fully decoded, mutually exclusive control lines.

The output of unit 300 is finally controlled by the n-channel output AND-gate 173 controlled by FALSZERO generated by the first stage LZD 201 as shown in FIG. 10. If all data bits [A68-A0] are zero, the output of NOR-gate 107 is asserted, causing the inverted FALSZERO signal out of buffer 174 of normalizing unit 300, FIG. 14, to be deasserted. This causes AND-gate 173 to create a zero valued output.

If should be noted that even though the preferred embodiment was described using two fully decoded prioritizers 105 and 111 in FIG. 10, it may be desirable to use standard large scale integrated chips, such as previously described, as the prioritizer units. If so, the outputs, BYTSEL and BITSEL, from the first and second staged LZD 20 would be binary encoded requiring a decode means in the normalization unit as shown in FIG. 1 and a decode means for multiplexer 109 of FIG. 10.

Also, the preferred embodiment used two LZD stages (201, 202) as shown in FIG. 14. However, it should be clear that three or more LZD stages may be used to detect the leading zero. FIG. 15 is an example of a three stage LZD. A 128-bit mantissa is assumed to be separated into 4 bundles of 32-bits each and applied to four 32-input OR-gates 113. Prioritizer 115 detects which 32-bit bundle has the most significant bit and activating an output line that controls selector 117. The selected segment of 32-bits is applied to eight 4-input OR-gates 123 and to selector 121. The output of prioritizer 119 causes selector 121 to select the 4-bit segment having the most significant bit.

These and other variations would be apparent to one skilled in the art.

What is claimed is:

1. A floating-point left-shift normalization unit for normalizing a string of N-bits representing an un-normalized N-bit mantissa, the normalization unit comprising:
   (a) input terminals for accepting the string of N-bits;
   (b) a leading zero detector comprising:
      (i) a segment detector having N input terminals and M output terminals, the N input terminals connected to the input terminals for accepting the string of N-bits, segmenting the string into M non-overlapping contiguous multi-bit segments arranged in descending order of significance, a set of M logic units one for each of the M segments, each logic unit for detecting if at least one bit belonging to a segment is active (high) and, if so, activating one-prescribed terminal of the M output terminals;
      (ii) a fully decoded M-input prioritizer having M input terminals and M outputs terminals, the M input terminals connected to the M output terminals of the segment detector for logically processing the output data of the segment detector to determine which of the M output terminals is both active (high) and also corresponds to the most significant segment, and activating one-out-of-M output terminals that corresponds to the most significant segment having an active bit;
      (iii) a fully decoded selector comprising a selection controller connected to the M-output terminals of the fully decoded M-input prioritizer, a set of M data terminals, each set of data terminal connected to accept a specific segment of the M contiguous segments of the N-bit mantissa string, the selection controller selecting and outputting the segment that corresponds to the only activated output terminal of the fully decoded M input prioritizer on a set of data output terminals;
      (iv) a fully decoded segment prioritizer having a set of input terminals and a set of output terminals, one output terminal per segment bit, the set of input terminals connected to the data output terminals of the fully decoded selector for accepting the selected segment and logically processing the segment to determine a bit location within the segment corresponding to the most significant active (high) bit, and activating only one output terminal corresponding to the most significant active bit location; and
   (c) a left shift unit for producing at its output a normalized N-bit string by left shifting in accordance with both the output of the fully decoded M-input prioritizer and the output of the fully decoded segment prioritizer, the left shift unit comprising:
      (i) a first stage left-shift unit having a set of N-input data terminal and a set of N-output data terminals, the set of input data terminals connected to the input terminals for accepting the string of N-bits, a set of shift control input terminals connected to the output terminals of the fully decoded M-input prioritizer for left shifting the string of N-bits by the number of bits contained in the segments of higher significance than the most significant segment having an active bit as indicated by the active terminal of the fully decoded M-input prioritizer, the left-shifted string of N-bits connected to the set of N-output data terminals; and
      (ii) a second stage left-shift unit having a set of N-input data terminals and a set of N-output data terminals, the set of input data terminals connected to the output data terminals of the first stage left shift unit, a set of shift control input terminals connected to the output terminals of the fully decoded segment prioritizer for left shifting the first stage left shift unit output by an additional number of bits corresponding to the number of bit locations from the most significant non-active bit to the location of the most significant active bit within the selected segment as indicated by the active output terminal of the fully decoded segment prioritizer.

2. A floating-point left-shift normalization unit as in claim 1 further comprising zero-output means for detecting if all bits of the string of N-bits are at the inactive (low) level and if so forcing all output bits of the left shift unit to low.

3. A floating-point left-shift normalization unit as in claim 2 wherein the zero-output means comprises:
   (a) an M-input NOR-gate with its M input terminals connected to the M output terminals of the segment detector for producing an active (high) output level if all M input logic levels are low; and
   (b) a set of N-gates for gating the normalized output of the left shift unit by means of a control terminal on each of the N-gates connected to the output of the M-input Nor-gate, for passing the normalized output of the left shift unit if the NOR-gate output is low, otherwise forcing all N output bits to low.

4. A floating-point left-shift normalization unit as in claim 1 for normalizing the string of N-bits in accordance with a hidden leading one normalization convention wherein the second stage left-shift unit shifts left by one additional bit location.

5. A floating-point left-shift normalization unit as in claim 1 wherein the segment detector comprises a set of M multi-input OR-gates, one multi-input OR-gate per segment, and each input of the multi-input OR-gate connected to one bit of the segment of the ordered output of the OR-gates being representative of the non-zero state of each segment.

6. A floating-point left-shift normalization unit as in claim 1 wherein the M-input prioritizer comprises:
   (a) a set of M-input terminals for accepting M-input bits arranged in descending order of significance $(D_{M-1}, D_{M-2}, \ldots, D_1, D_0)$ from the M output terminals of the segment detector;
   (b) a set of M-output terminals;
   (c) a set of M-inverting buffers connected to the M-input terminals for forming the logical complement of corresponding M-input bits $(\overline{D}_{M-1}, \overline{D}_{M-2}, \ldots, \overline{D}_1, \overline{D}_0)$; and
   (d) logic gates for logical ANDing input bits and complemented input bits to produce, at the M output terminals, M logic terms of the form $$P_{M-k} = D_{M-k} \cdot \overline{D}_{M-k+1} \cdot \overline{D}_{M-k+2} \ldots \overline{D}_{M-1}$$

for $k = 1, 2, \ldots, M$, thereby generating a fully decoded prioritizer output by assuring that the output terminal for $P_{M-k}$ is active (high) if $D_{M-k}$ is the most significant active input bit, while all other output terminals are low.

7. A floating-point left-shift normalization unit as in claim 1 wherein the fully decoded segment prioritizer comprises:

(a) L input terminals for accepting a bit string of L bits arranged in descending order of significance ($D_{L-1}$, $D_{L-2}$, ..., $D_1$, $D_0$) representing the segment provided at the output terminals of the fully decoded selector;

(b) L output terminals;

(c) L inverting buffers connected to the L input terminals for forming the logical complement of corresponding L input bits ($\overline{D}_{L-1}$, $\overline{D}_{L-2}$, ..., $\overline{D}_0$); and (d) logic gates for logically ANDing input bits and complemented input bits to produce, at the output terminals, L logic terms of the form $$P_{L-k} = D_{L-k} \cdot (\overline{D}_{L-k+1} \cdot \overline{D}_{L-k+2} \ldots \overline{D}_{L-1})$$

for $k = 1, 2, \ldots, L$, thereby providing a fully decoded prioritizer output by assuring that the output terminal for $P_{L-k}$ is active (high) if $D_{L-k}$ is the most significant active input bit, while all other output terminals are low.

8. A floating-point left-shift normalization unit for normalizing an input bit string representing an un-normalized mantissa using at least two left-shift stages comprising:

(a) input terminals for accepting the string of bits;

(b) at least one segment detector-prioritizer-selector stage, and, if more than one, each additional stage connected in tandem to form a multi-stage detector-prioritizer unit, each stage comprising:

(i) a segment detector comprising a multiplicity of multiple input OR-gates, each connected to a distinct contiguous non-overlapping segment of the input string of bits, and a set of output terminals, one for each OR-gate arranged in descending order of significance of the segment connected to the multiple-input OR-gate for producing an active (high) output at each OR-gate output if the input segment contains an active (high) bit; and (ii) a prioritizer having input terminals connected to the OR-gate ordered outputs for detecting the most significant segment containing an active (high) bit and having a corresponding set of ordered output terminals for producing at its output terminals a fully decoded output wherein only one output terminal is high at a time, that terminal corresponding to the most significant segment containing an active (high) bit; and (iii) a selector gate network with its input connected to the input bit string for selecting the most significant segment of the input bit string, controlled by the fully decoded output of the prioritizer;

each of the tandemly connected segment detector-prioritizer-selector stages uses the selector output of a prior segment detector-prioritizer-selector as an input bit string, a final segment detector-prioritizer-selector stage of the tandemly connected multi-stage detector-prioritizer unit producing a final bit string segment at its output; and (c) a terminal prioritizer unit with its input connected to the output of the final segment detector-prioritizer-selector stage, for producing at its output terminals a fully decoded set of signals with only one active (high) signal corresponding to the most significant active bit position of the final bit string segment;

(d) a multistage left-shift unit having one left-shift stage per each segment detector-prioritizer-shifter stage plus one left-shift stage for the terminal prioritizer unit, each left-shift stage controlled by the fully decoded output of a prioritizer associated with a given stage, for producing at its output terminals a left-shifted normalized bit string representative of the normalized mantissa.

9. A floating-point left-shift normalization unit as in claim 8 further comprising a logic circuit for determining if all bits of the input bit string are inactive (low) and, if so, forcing all output bits on the output terminals of the multistage left-shift unit inactive (low).

10. A floating-point left-shift normalization unit as in claim 8 wherein the multistage left-shift unit shifts to produce a leading-one normalization.

11. A floating-point left-shift normalization unit as in claim 8 wherein the last left-shift stage of the multistage left-shift unit shifts by one additional bit in order to produce a hidden leading one normalization.

* * * * *